United States Patent
Zhang et al.

(10) Patent No.: US 9,703,437 B2
(45) Date of Patent: Jul. 11, 2017

(54) TOUCH PANEL AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Lei Zhang, Beijing (CN); Ming Hu, Beijing (CN); Ming Zhang, Beijing (CN); Taofeng Xie, Beijing (CN); Lingyan Wu, Beijing (CN); Yang Liu, Beijing (CN); Zhixiang Fang, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 14/786,498

(22) PCT Filed: May 18, 2015

(86) PCT No.: PCT/CN2015/079194
§ 371 (c)(1),
(2) Date: Oct. 22, 2015

(87) PCT Pub. No.: WO2016/086613
PCT Pub. Date: Jun. 9, 2016

(65) Prior Publication Data
US 2016/0349873 A1 Dec. 1, 2016

(30) Foreign Application Priority Data
Dec. 5, 2014 (CN) .......................... 2014 1 0737089

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04112* (2013.01)

(58) Field of Classification Search
CPC ......... G06F 2203/04112; G06F 3/0412; G06F 3/044
See application file for complete search history.

(56) References Cited

U.S. PATENT DOCUMENTS

2010/0328208 A1  12/2010  Austin et al.
2011/0234532 A1  9/2011  Hsu
(Continued)

FOREIGN PATENT DOCUMENTS

CN  102645997 A  8/2012
CN  102968225 A  3/2013
(Continued)

OTHER PUBLICATIONS

Office Action in Chinese Patent Application No. 201410737089.X, dated Dec. 14, 2016.
(Continued)

*Primary Examiner* — Hong Zhou
(74) *Attorney, Agent, or Firm* — Brooks Kushman P.C.

(57) ABSTRACT

The present disclosure provides a touch panel and a display device. The touch panel includes a glass substrate and a conductive film arranged on the glass substrate. The conductive film includes a base material and a conductive layer arranged on the base material. The conductive layer includes first conductive patterns and second conductive patterns, each of which includes a plurality of meshes formed by conductive wires crossing each other. The first conductive patterns are each of an X-shaped structure and arranged in
(Continued)

an array form, and the second conductive patterns are each formed at a region surrounding by the adjacent first conductive patterns, arranged adjacent to and insulated from the first conductive pattern, and arranged in an array form.

16 Claims, 4 Drawing Sheets

(56) References Cited

U.S. PATENT DOCUMENTS

| | | | |
|---|---|---|---|
| 2013/0194213 A1* | 8/2013 | Chou | G06F 3/044 345/173 |
| 2014/0035864 A1* | 2/2014 | Chang | G06F 3/044 345/174 |
| 2014/0174902 A1* | 6/2014 | Yang | G06F 3/044 200/600 |
| 2014/0197018 A1* | 7/2014 | Chen | H03K 17/9622 200/600 |
| 2014/0293160 A1* | 10/2014 | Tang | G02F 1/13338 349/12 |
| 2014/0300833 A1* | 10/2014 | Yang | G06F 3/044 349/12 |
| 2015/0085205 A1* | 3/2015 | Chen | G06F 3/044 349/12 |
| 2015/0268757 A1* | 9/2015 | Chandran | G06F 3/044 345/174 |

FOREIGN PATENT DOCUMENTS

| | | |
|---|---|---|
| CN | 103425342 A | 12/2013 |
| CN | 103426504 A | 12/2013 |
| CN | 103534671 A | 1/2014 |
| CN | 103677410 A | 3/2014 |
| CN | 203596005 U | 5/2014 |
| CN | 103955320 A | 7/2014 |
| CN | 104375735 A | 2/2015 |
| CN | 204215395 U | 3/2015 |

OTHER PUBLICATIONS

International Search Report and Written Opinion in PCT International Application No. PCT/CN2015/079194, dated Aug. 27, 2015.

* cited by examiner

TOUCH PANEL AND DISPLAY DEVICE

CROSS-REFERENCE TO RELATED APPLICATION

This application is the U.S. national phase of PCT Application No. PCT/CN2015/079194 filed on May 18, 2015, which claims a priority of the Chinese Patent Application No. 201410737089.X filed on Dec. 5, 2014, the disclosures of which are incorporated in their entirety by reference herein.

TECHNICAL FIELD

The present disclosure relates to the field of touch display technology, in particular to a touch panel and a display device.

BACKGROUND

Depending on their operating principles, there exist two kinds of touch panels, i.e., resistive touch panels and capacitive touch panels, and currently the latter has been widely used in electronic products. The capacitive touch panel, which operates by means of an induced current of a human body, may sense a touch signal through the combination of the characteristics of human body and electrodes. When the panel is touched by the human body (e.g., a finger), a coupling capacitance is generated between the finger and a conductive layer of the touch panel due to the existing of an electric field of the human body, and the current generated by the electrode on the touch panel will flow toward a contact point, so it is able to calculate a position of the touch point accurately.

Usually, a conductive film of the touch panel, as a part of great importance, includes a conductive layer and an insulating base material. The conductive layer is usually made of indium tin oxide (ITO) and formed on the insulating base material through vacuum-evaporation, patterning and etching. Then, the conductive film is adhered onto a transparent glass panel by an adhesive layer, so as to form the touch panel.

However, indium is scarce and expensive, so ITO is very expensive. In addition, when ITO is applied onto a surface of the entire insulating base material and then patterned and etched, a great quantity of ITO will be wasted, so the production cost of the conductive layer will increase remarkably.

In order to overcome these defects, a new-generation touch technique called "metal mesh" has been presented, where a metal mesh made of silver, instead of ITO, is arranged on the base material so as to form the conductive layer. However, the existing metal-mesh-type touch panel is of a single structure and non-compatible with a capacitance of a market-available touch driver chip, so the application of this kind of touch panel is limited.

SUMMARY

An object of the present disclosure is to provide a touch panel and a display device, so as to provide a novel metal mesh, a size and a structure of which are adjustable so as to match a capacitance of a touch driver chip and display panels with different sizes.

In one aspect, the present disclosure provides in one embodiment a touch panel, including a glass substrate and a conductive film arranged on the glass substrate. The conductive film includes a base material and a conductive layer arranged on the base material. The conductive layer includes first conductive patterns and second conductive patterns, each of which includes a plurality of meshes formed by conductive wires crossing each other. The first conductive patterns are each of an X-shaped structure and arranged in an array form, and the second conductive patterns are each formed at a region surrounding by the adjacent first conductive patterns, arranged adjacent to and insulated from the first conductive pattern, and arranged in an array form.

Alternatively, the second conductive patterns are each of an X-shaped structure.

Alternatively, the adjacent first conductive patterns are connected to each other, and the adjacent second conductive patterns are connected to each other.

Alternatively, each top end surface of the X-shaped structure of each of the first conductive patterns and the second conductive patterns is provided with a protruded sharp end.

Alternatively, four sharp ends of each first conductive pattern correspond to four angles of a first diamond pattern, and four sharp ends of each second conductive pattern correspond to four angles of a second diamond pattern.

Alternatively, the first conductive pattern includes a first conductive segment and a second conductive segment extending in opposite directions, and a third conductive segment and a fourth conductive segment extending in opposite directions, the first conductive segment, the second conductive segment, the third conductive segment and the fourth conductive segment are connected to each other, and the first conductive segment and the second conductive segment are perpendicular to the third conductive segment and the fourth conductive segment, respectively.

Alternatively, the first conductive segments and the second conductive segments of the first conductive patterns are arranged in rows, and the third conductive segments and the fourth conductive segments of the first conductive patterns are arranged in columns.

Alternatively, a total length of the first conductive segment and the second conductive segment is of a first value, and a total length of the third conductive segment and the fourth conductive segment is of a second value equal to the first value.

Alternatively, the first conductive segment, the second conductive segment, the third conductive segment and the fourth conductive segment are of an identical length.

Alternatively, each second conductive pattern includes a first conductive segment and a second conductive segment extending in opposite directions, and a third conductive segment and a fourth conductive segment extending in opposite directions, the first conductive segment, the second conductive segment, the third conductive segment and the fourth conductive segment are connected to each other, and the first conductive segment and the second conductive segment are perpendicular to the third conductive segment and the fourth conductive segment, respectively.

Alternatively, the first conductive segments and the second conductive segments of the second conductive patterns are arranged in rows, and the third conductive segments and the fourth conductive segments of the second conductive patterns are arranged in columns.

Alternatively, a total length of the first conductive segment and the second conductive segment is of a third value, and a total length of the third conductive segment and the fourth conductive segment is of a fourth value equal to the third value.

Alternatively, the first conductive segment, the second conductive segment, the third conductive segment and the fourth conductive segment are of an identical length.

Alternatively, the first value and the second value are greater than or equal to 3 mm, and less than or equal to 7 mm.

Alternatively, the third conductive segments are each of a size and a structure identical to the fourth conductive segments, each of the third conductive segments and the fourth conductive segments includes a first top end segment, the first top end segment includes a first perpendicular segment perpendicular to an extension direction of the third conductive segment and the fourth conductive segment and a first sharp end segment inclined at an angle of greater than 90° and less than 180° relative to the first perpendicular segment, a length of the first perpendicular segment is B, a perpendicular distance from the first perpendicular segment to each of the first conductive segment and the second conductive segment is C and a length of the first sharp end segment is D, the first conductive segments are each of a size and a structure identical to the second conductive segments, each of the first conductive segments and the second conductive segments includes a second top end segment, the second top end segment includes a second perpendicular segment perpendicular to an extension direction of the first conductive segment and the second conductive segment and a second sharp end segment inclined at an angle of greater than 90° and less than 180° relative to the second perpendicular segment, and a perpendicular distance from the second perpendicular segment to each of the third conductive segment and the fourth conductive segment is A.

Alternatively, D is of a value of 0.5 mm, C is a sum of a value of A and a value of B, when the first value and the second value are each greater than or equal to 3 mm and less than or equal to 4 mm, A is greater than 0 and less than or equal to 2 mm and B is greater than o and less than or equal to 2 mm, when the first value and the second value are each greater than 4 mm and less than or equal to 5 mm, A is greater than 0 and less than or equal to 2.5 mm and B is greater than 0 and less than or equal to 2.5 mm, when the first value and the second value are each greater than 5 mm and less than or equal to 6 mm, A is greater than 0 and less than or equal to 3 mm and B is greater than 0 and less than or equal to 3 mm, and when the first value and the second value are each greater than 6 mm and less than or equal to 7 mm, A is greater than 0 and less than or equal to 3.5 mm and B is greater than 0 and less than or equal to 3.5 mm.

Alternatively, the first conductive patterns and the second conductive patterns each include hexagonal meshes formed by conductive wires crossing each other.

Alternatively, the conductive wire of each of the first conductive patterns and the second conductive patterns is of a diameter of 0.003 mm to 0.01 mm.

In another aspect, the present disclosure provides in one embodiment a display device including a display substrate and the above-mentioned touch panel.

Alternatively, each first conductive pattern is of an X-shaped structure, two portions of the X-shaped structure crossing each other extend in directions identical to arrangement directions of a data line and a gate line on the display substrate.

As compared with the existing conductive layer formed by metal meshes with a diamond pattern, the conductive layer in the embodiments of the present disclosure is provided with a novel metal mesh where the first conductive patterns are each of an X-shaped structure. Through changing the angles between the two portions of the X-shaped structure and the lengths thereof, it is able to change the shape and size of the conductive layer, thereby to adjust the size and structure of the conductive layer to match the capacitance of the touch driver chip and the display panels with different sizes.

DETAILED DESCRIPTION

In order to make the objects, the technical solutions and the advantages of the present disclosure more apparent, the present disclosure will be described hereinafter in conjunction with the drawings and embodiments.

Figure 1:
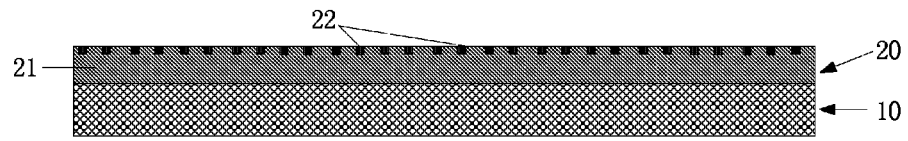
FIG. 1 is a sectional view of a touch panel according to one embodiment of the present disclosure.

As shown in FIG. 1, which is a sectional view of a touch panel according to one embodiment of the present disclosure, the touch panel includes a glass substrate 10 and a conductive film 20 arranged on the glass substrate 10. The conductive film 20 includes a base material 21 and a conductive layer 22 arranged on the base material 21. To be specific, the conductive layer 22 includes first conductive patterns and second conductive patterns, each of which includes a plurality of meshes formed by conductive wires crossing each other.

Figure 2:
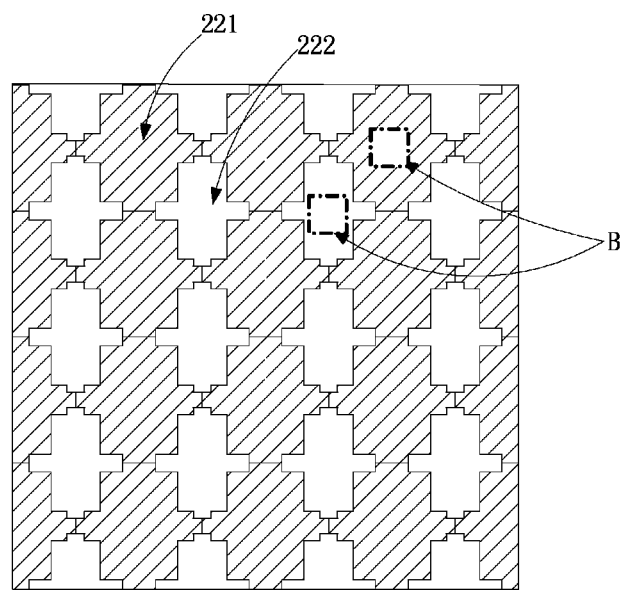
FIG. 2 is a schematic view showing patterns at a conductive layer in the touch panel according to the first embodiment of the present disclosure.
Figure 3A:
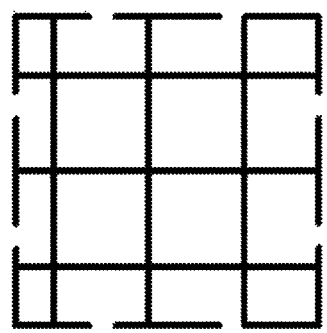
FIGS. 3a-3d are exploded views of mesh-like structures of a first conductive pattern and a second conductive pattern formed at regions B in FIG. 2.
Figure 3B:
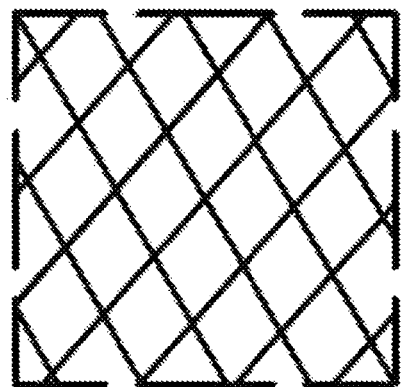
Figure 3C:
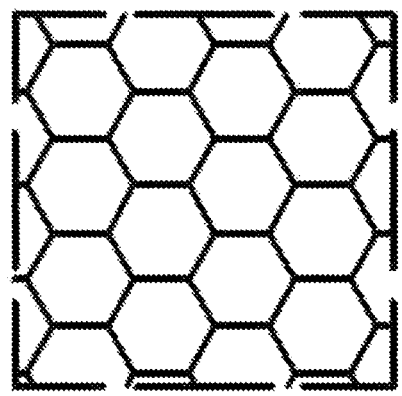
Figure 3D:
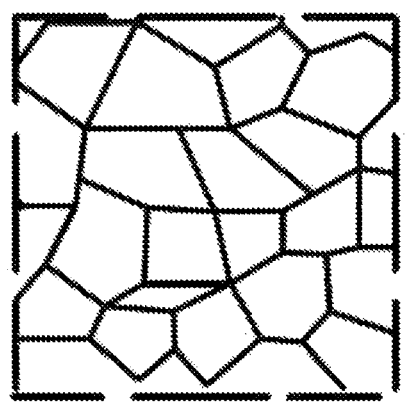

As shown in FIG. 2, which is a schematic view showing the patterns at the conductive layer in the touch panel according to the first embodiment, the conductive layer 22 includes the first conductive patterns 221 and the second conductive patterns 222. The first conductive patterns 221 are each of an X-shaped structure and arranged in an array form, and the second conductive patterns 222 are each formed at a region surrounding by the adjacent first conductive patterns 221, arranged adjacent to and insulated from the first conductive pattern 221, and arranged in an array form.

As compared with an existing conductive layer formed by metal meshes with a diamond pattern, the conductive layer in the embodiment of the present disclosure is provided with a novel metal mesh where the first conductive patterns 221 are each of an X-shaped structure. Through changing the angles between tow portions of the X-shaped structure crossing each other and the lengths thereof, it is able to change a shape and a size of the conductive layer, thereby to adjust the size and the structure of the conductive layer to match a capacitance of a touch driver chip and display panels with different sizes. It should be appreciated that, in the embodiments of the present disclosure, the X-shaped structure refers to that the conductive pattern has two portions crossing each other, and when viewed in different directions, this X-shaped structure may also be considered as a crisscross structure, as shown in FIG. 2. Of course, the two portions are not necessarily perpendicular to each other.

Alternatively, the second conductive patterns 222 are each of an X-shaped structure too, as shown in FIG. 2.

In the conductive layer 22 of the touch panel, the first conductive patterns 221 and the second conductive patterns 222 are arranged adjacent to each other in a staggered manner. The adjacent first conductive patterns 221 are connected to each other, the adjacent second conductive patterns 222 are connected o each other, and the first conductive patterns 221 are insulated from the second conductive patterns 222. The connection between the second conductive patterns 222 is not shown in FIG. 2 (referring to the connection between 2213 and 2214 as shown in FIG. 5).

In addition, in this embodiment, the two portions of each first conductive pattern 221 are perpendicular to each other, i.e., a crisscross pattern is formed as shown in FIG. 2. In addition, when the touch panel is assembled with a display panel, the two portions extend in directions identical to arrangement directions of a data line and a gate line on the display panel, respectively. Similarly, the two portions of each second conductive pattern 222 are perpendicular to each other, i.e., a crisscross pattern is formed as shown in FIG. 2, and when the touch panel is assembled with the display panel, the two portions extend in directions identical to the arrangement directions of the data line and the gate line on the display panel, respectively. In this way, in an X-axis direction and a Y-axis direction, the first conductive patterns 221 and the second conductive patterns 22 are arranged alternately, so as to form a plurality of sensing points arranged alternately.

Figure 5:
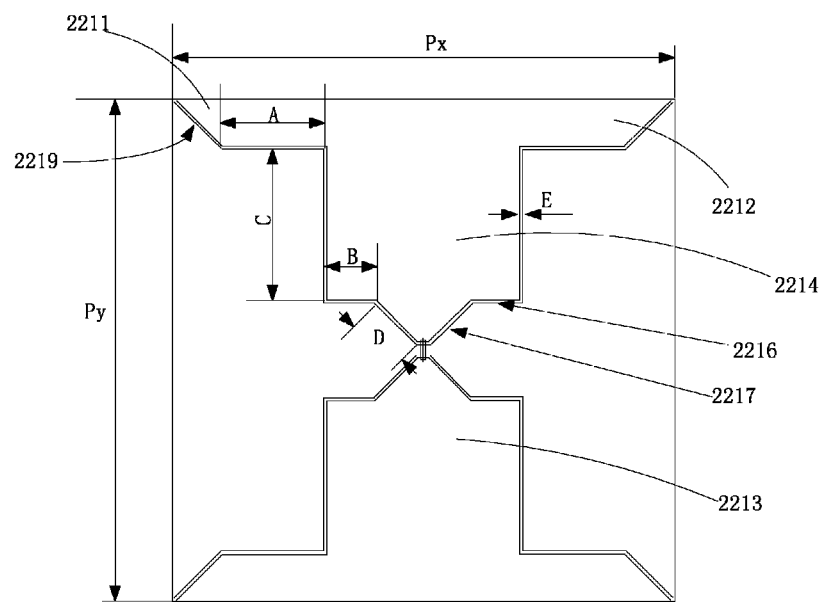
FIG. 5 is an exploded view of region A in FIG. 4.

In addition, as shown in FIG. 2, the two portions of the first conductive pattern 221 are of different widths (which may be calculated in accordance with A, B and C as shown in FIG. 5), so as to form the crisscross structure of the first conductive pattern 221. Similarly, the two portions of the second conductive pattern 222 are of different widths, so as to form the crisscross structure of the second conductive pattern 222.

In this embodiment, the first conductive patterns 221 and the second conductive patterns 222 each include a plurality of meshes formed by conductive wires crossing each other. As shown in FIGS. 3a-3d which are exploded views of a mesh-like structure at region B in FIG. 2, each mesh may be of a square shape, a diamond shape, a hexagonal shape or an irregular shape, and alternatively, the mesh is of a hexagonal shape. When the conductive pattern includes the hexagonal meshes, it is able to effectively improve the light transmission of the metal-mesh-type touch panel, because a shielding rate of the hexagonal mesh with respect to light is less than that of the other mesh in the case of an identical area.

Figure 4:
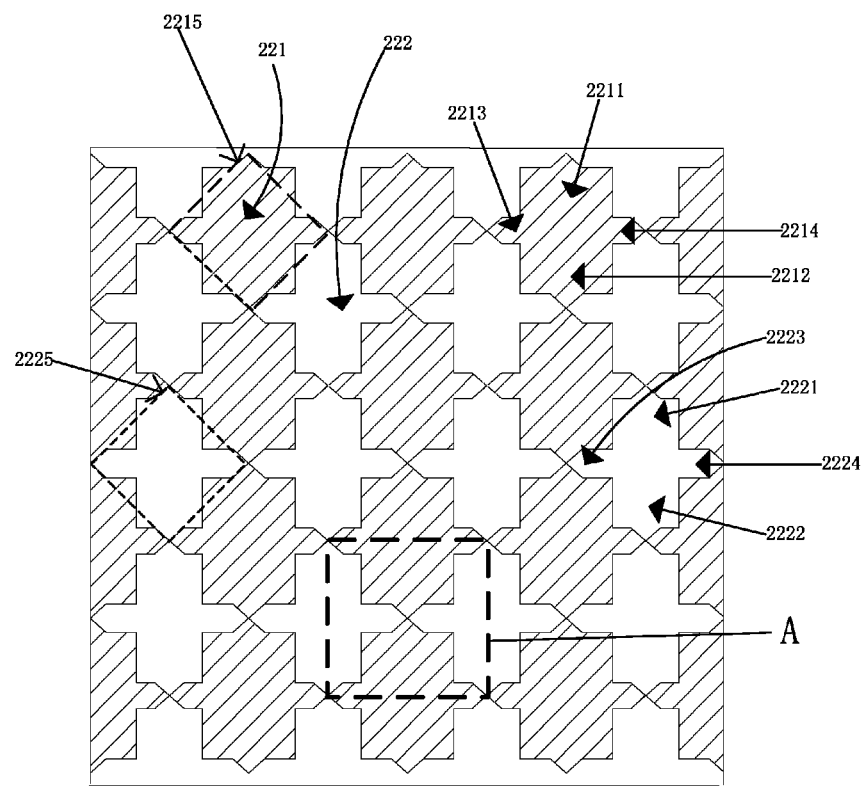
FIG. 4 is a schematic view showing the conductive layer in the touch panel according to the second embodiment of the present disclosure.

Referring to FIG. 4, in the second embodiment of the present disclosure, the shapes of the first conductive patterns 221 and the second conductive patterns 222 are modified, on the basis of the structure mentioned in the first embodiment. To be specific, each top end surface of the crisscross structure of each of the first conductive patterns 221 and the second conductive patterns 222 is provided with a protruded sharp end. The adjacent first conductive patterns 221 are connected to each other through two sharp ends so as to improve the sensitivity, and so do the adjacent second conductive patterns 222.

Alternatively, as shown in FIG. 4, the four sharp ends 2215 of each first conductive pattern 221 correspond to four angles of a first diamond pattern, and the four sharp ends 2225 of each second conductive pattern 222 correspond to four angles of a second diamond pattern. To be specific, the sharp ends 2215 and 2225 each consists of two oblique lines crossing each other. Extension lines of the oblique lines of the four sharp ends 2215 of the first conductive pattern 221 are connected to to from a diamond pattern (shown by the dotted line), so these four sharp ends 2215 correspond to the four angles of the diamond pattern. Identically, extension lines of the oblique lines of the four sharp ends 2225 of the second conductive pattern 222 are connected to also form a diamond pattern (shown by the dotted line).

In addition, referring to FIG. 4, the first conductive pattern 221 includes a first conductive segment 2211 and a second conductive segment 2212 extending in opposite directions, and a third conductive segment 2213 and a fourth conductive segment 2214 extending in opposite directions. The first conductive segment 2211, the second conductive segment 2212, the third conductive segment 2213 and the fourth conductive segment 2214 are connected to each other. The first conductive segment 2211 and the second conductive segment 2212 are perpendicular to the third conductive segment 2213 and the fourth conductive segment 2214, respectively, so as to form the crisscross pattern.

Further, the first conductive segments 2211 and the second conductive segments 2212 of the first conductive patterns 221 are arranged in rows, and the third conductive segments 2213 and the fourth conductive segments 2214 of the first conductive patterns 221 are arranged in columns.

Alternatively, a total length of the first conductive segment 2211 and the second conductive segment 2212 is of a first value, and a total length of the third conductive segment 2213 and the fourth conductive segment 2214 is of a second value equal to the first value. Alternatively, the first conductive segment 2211, the second conductive segment 2212, the third conductive segment 2213 and the fourth conductive segment 2214 are of an identical length.

Identically, referring to FIG. 4, each second conductive pattern 222 includes a first conductive segment 2221 and a second conductive segment 2222 extending in opposite directions, and a third conductive segment 2223 and a fourth conductive segment 2224 extending in opposite directions. The first conductive segment 2221, the second conductive segment 2222, the third conductive segment 2223 and the fourth conductive segment 2224 are connected to each other. The first conductive segment 2221 and the second conductive segment 2222 are perpendicular to the third conductive segment 2223 and the fourth conductive segment 2224, respectively, so as to form the crisscross pattern.

In addition, the first conductive segments 2221 and the second conductive segments 2222 of the second conductive patterns 222 are arranged in rows, and the third conductive segments 2223 and the fourth conductive segments 2224 of the second conductive patterns 222 are arranged in columns.

Alternatively, for the second conductive pattern 222, a total length of the first conductive segment 2221 and the second conductive segment 2222 is of a third value, and a total length of the third conductive segment 2223 and the fourth conductive segment 2224 is of a fourth value equal to the third value, i.e., the two portions of the second conductive pattern 222 crossing each other are of an identical length. Alternatively, the first conductive segment 2221, the second conductive segment 2222, the third conductive segment 2223 and the fourth conductive segment 2224 are of an identical length.

According to the touch panel in the first and second embodiments of the present disclosure, through changing the lengths of the two portions of each of the first conductive patterns and the second conductive patterns, it is able to change the shape and the size of the pattern, thereby to simplify the design, and facilitate the adjustment of the size of the conductive layer in accordance with the capacitance of the touch driver chip and the size of the display panel.

Further, in the third embodiment of the present disclosure, the first conductive patterns 221 and the second conductive patterns 222 of the conductive layer 22 are each of a structure identical to those mentioned in the second embodiment, as shown in FIG. 4. However, in the third embodiment, the size of each of the first conductive pattern 221 and the second conductive pattern 222 is determined in such a manner as to enable a capacitance of the touch panel to be within 0.8 to 3 pF, thereby to be compatible with a capacitance of a driver chip connected to the touch panel and applicable to the driver chips from various manufacturers, or even applicable to a driver chip of a touch panel with an ITO structure. In addition, alternatively, the capacitance of the touch panel in this embodiment is within a range of 1.2 to 1.6 pF, so as to achieve an optimal touch effect.

Referring to FIG. 4 in conjunction with FIG. 5 which is an exploded view of region A in FIG. 4, two horizontal boundaries of region A are located at central lines of two adjacent first conductive patterns 221 in a longitudinal direction, respectively, and two longitudinal boundaries of region A are located at central lines of two adjacent second conductive patterns 222 in a horizontal direction, respectively. The four conductive segments of each of the first conductive pattern 221 and the second conductive pattern 222 are of an identical length, so the first conductive pattern 221 and the second conductive pattern 222 each have symmetrical central lines in the longitudinal direction and the horizontal direction, respectively. As shown in FIG. 5, the sizes of the segments of the first conductive pattern 221 and the second conductive pattern 222 at region A may be used to show the entire sizes of the first conductive pattern 221 and the second conductive pattern 222.

Referring to FIG. 5, the total length of the first conductive segment 2211 and the second conductive segment 2212 of the first conductive pattern 221 is Px, and the total length of the third conductive segment 2213 and the fourth conductive segment 2214 is Py. In this embodiment, Px is equal to Py, and alternatively, Py and Px are each greater than or equal to 3 mm and less than or equal to 7 mm.

In this embodiment, for the first conductive patterns 221, the third conductive segments 2213 are each of a size and a structure identical to the fourth conductive segments 2214, and each of the third conductive segments 2213 and the fourth conductive segments 2214 includes a first top end segment. The first top end segment includes a first perpendicular segment 2216 perpendicular to an extension direction of the third conductive segment 2213 and the fourth conductive segment 2214 and a first sharp end segment 2217 inclined at an angle of greater than 90° and less than 180° relative to the first perpendicular segment 2216. A length of the first perpendicular segment 2216 is B, a perpendicular distance from the first perpendicular segment 2216 to each of the first conductive segment 2211 and the second conductive segment 2212 is C, and a length of the first sharp end segment 2217 is D. The first conductive segments 2211 are each of a size and a structure identical to the second conductive segments 2212, and each of the first conductive segments 2211 and the second conductive segments 2212 includes a second top end segment. The second top end segment includes a second perpendicular segment (not shown) perpendicular to an extension direction of the first conductive segment and the second conductive segment and a second sharp end segment 2219 inclined at an angle of greater than 90° and less than 180° relative to the second perpendicular segment, and a perpendicular distance from the second perpendicular segment to each of the third conductive segment and the fourth conductive segment is A.

In this embodiment, as shown in FIG. 5, a length of the second perpendicular segment is zero, i.e., a distances from the second perpendicular segment to each of the third conductive segment 2213 and the fourth conductive segment 2214 is equal to a distance from an end of the second sharp end segment 2219 close to the third conductive segment 2213 and the fourth conductive segment 2214 to each of the third conductive segment 2213 and the fourth conductive segment 2214.

In addition, as shown in FIG. 5, a distance from the first conductive pattern 221 to the second conductive pattern 222 is E.

For the first conductive pattern 221 with the above-mentioned structure, the following table shows the values of the sizes.

| Px(Py) (mm) | A (mm) | B (mm) | C (mm) | D (mm) | E (mm) |
|---|---|---|---|---|---|
| 3 ≤ Px(Py) ≤ 4 | 0 < A ≤ 2 | 0 < B ≤ 2 | A + B | 0.5 | 0.03 |
| 4 < Px(Py) ≤ 5 | 0 < A ≤ 2.5 | 0 < B ≤ 2.5 | | | |
| 5 < Px(Py) ≤ 6 | 0 < A ≤ 3 | 0 < B ≤ 3 | | | |
| 6 < Px(Py) ≤ 7 | 0 < A ≤ 3.5 | 0 < B ≤ 3.5 | | | |

In addition, in the third embodiment of the present disclosure, referring to FIG. 4 in conjunction with FIG. 5, the four sharp ends of the two portions of the first conductive pattern 221 each include two sharp end segments crossing each other. Alternatively, the sharp end segments of the four sharp ends are located at four edges of a diamond pattern, respectively, as shown in FIG. 4. Identically, the four sharp ends of the two portions of the second conductive pattern 222 each include two sharp end segments crossing each other, and alternatively, these sharp end segments of the four sharp ends are located at four edges of a diamond pattern, respectively.

Alternatively, the conductive wire of each of the first conductive patterns and the second conductive patterns is of a diameter of 0.003 mm to 0.01 mm. The smaller the diameter, the higher the light transmission of the touch panel, and the fainter the Morie fringes.

Based on the above design, it is able to ensure a capacitance of the touch panel to be within a range of 0.8 to 3 pF, thereby to be compatible with a capacitance of a driver chip connected to the touch panel (usually within a range of 1 to 3 pF), applicable to any driver chips from various manufacturers, and even applicant to a driver chip of the touch panel with an ITO structure. The following table shows the capacitances of the touch panel in the case of the above-mentioned sizes. Experimental results show that, when the sizes are within the mentioned ranges, it is able to ensure the capacitance of the touch panel to be within a range of 0.8 to 3 pF, so as to be compatible with the capacitance of the driver chip connected to the touch panel.

| Px (mm) | Py (mm) | A (mm) | B (mm) | C (mm) | D (mm) | E (mm) | Capacitance |
|---|---|---|---|---|---|---|---|
| 3 | 3 | 1 | 1 | 2 | 0.5 | 0.03 | 0.8~2 pF |
| 3 | 3 | 2 | 2 | 4 | | | 0.8~2 pF |
| 3 | 3 | 1 | 2 | 3 | | | 0.8~2 pF |
| 4 | 4 | 1 | 1 | 2 | | | 0.8~2 pF |
| 4 | 4 | 2 | 2 | 4 | | | 0.8~2 pF |
| 4 | 4 | 1 | 2 | 3 | | | 0.8~2 pF |
| 5 | 5 | 1 | 1 | 2 | | | 1~2 pF |
| 5 | 5 | 2 | 2.5 | 4 | | | 1~2 pF |
| 5 | 5 | 2.5 | 2.5 | 5 | | | 1~2 pF |

-continued

| Px (mm) | Py (mm) | A (mm) | B (mm) | C (mm) | D (mm) | E (mm) | Capacitance |
|---|---|---|---|---|---|---|---|
| 6 | 6 | 3 | 3 | 6 | | | 1~2.5 pF |
| 6 | 6 | 2 | 3 | 5 | | | 1~2.5 pF |
| 7 | 7 | 3.5 | 3.5 | 7 | | | 1~2.5 pF |
| 7 | 7 | 1 | 2 | 3 | | | 1~2.5 pF |
| 7 | 7 | 2 | 3 | 5 | | | 1~2.5 pF |

The present disclosure further provides in one embodiment a display device, which includes a display substrate and the above-mentioned touch panel. To be specific, when the touch panel is assembled with the display substrate to form the display device, the two portions of the X-shaped structure of the first conductive pattern extend in directions identical to arrangement directions of a data line and a gate line on the display substrate, and the two portions of the X-shaped structure of the second conductive pattern also extend in directions identical to the arrangement directions of the data line and the gate line on the display substrate.

A method for assembling the touch panel with the display substrate is known in the art, and thus will not be particularly defined herein.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A touch panel, comprising a glass substrate and a conductive film arranged on the glass substrate, the conductive film comprising a base material and a conductive layer arranged on the base material, wherein
the conductive layer comprises first conductive patterns and second conductive patterns, each of which comprises a plurality of meshes formed by conductive wires crossing each other;
the first conductive patterns are each of an X-shaped structure and arranged in an array form, and the second conductive patterns are each formed at a region surrounding by the adjacent first conductive patterns, arranged adjacent to and insulated from the first conductive pattern, and arranged in an array-form,
the first conductive pattern comprises a first conductive segment and a second conductive segment extending in opposite directions, and a third conductive segment and a fourth conductive segment extending in opposite directions, the first conductive segment, the second conductive segment, the third conductive segment and the fourth conductive segment are connected to each other, and the first conductive segment and the second conductive segment are perpendicular to the third conductive segment and the fourth conductive segment, respectively,
a total length of the first conductive segment and the second conductive segment is of a first value, and a total length of the third conductive segment and the fourth conductive segment is of a second value equal to the first value, the first value and the second value are greater than or equal to 3 mm, and less than or equal to 7 mm, the third conductive segments are each of a size and a structure identical to the fourth conductive segments,
each of the third conductive segments and the fourth conductive segments comprises a first top end segment, the first top end segment comprises a first perpendicular segment perpendicular to an extension direction of the third conductive segment and the fourth conductive segment and a first sharp end segment inclined at an angle of greater than 90° and less than 180° relative to the first perpendicular segment,
a length of the first perpendicular segment is B, a perpendicular distance from the first perpendicular segment to each of the first conductive segment and the second conductive segment is C and a length of the first sharp end segment is D,
the first conductive segments are each of a size and a structure identical to the second conductive segments,
each of the first conductive segments and the second conductive segments comprises a second top end segment, the second top end segment includes a second perpendicular segment perpendicular to an extension direction of the first conductive segment and the second conductive segment and a second sharp end segment inclined at an angle of greater than 90° and less than 180° relative to the second perpendicular segment, and
a perpendicular distance from the second perpendicular segment to each of the third conductive segment and the fourth conductive segment is A.

2. The touch panel according to claim 1, wherein the second conductive patterns are each of an X-shaped structure.

3. The touch panel according to claim 2, wherein each top end surface of the X-shaped structure of each of the first conductive patterns and the second conductive patterns is provided with a protruded sharp end.

4. The touch panel according to claim 3, wherein four sharp ends of each first conductive pattern correspond to four angles of a first diamond pattern, and four sharp ends of each second conductive pattern correspond to four angles of a second diamond pattern.

5. The touch panel according to claim 1, wherein the adjacent first conductive patterns are connected to each other, and the adjacent second conductive patterns are connected to each other.

6. The touch panel according to claim 1, wherein the first conductive segments and the second conductive segments of the first conductive patterns are arranged in rows, and the third conductive segments and the fourth conductive segments of the first conductive patterns are arranged in columns.

7. The touch panel according to claim 1, wherein the first conductive segment, the second conductive segment, the third conductive segment and the fourth conductive segment are of an identical length.

8. The touch panel according to claim 1, wherein each second conductive pattern comprises a first conductive segment and a second conductive segment extending in opposite directions, and a third conductive segment and a fourth conductive segment extending in opposite directions, the first conductive segment, the second conductive segment, the third conductive segment and the fourth conductive segment are connected to each other, and the first conductive segment and the second conductive segment are perpendicular to the third conductive segment and the fourth conductive segment, respectively.

9. The touch panel according to claim 8, wherein the first conductive segments and the second conductive segments of the second conductive patterns are arranged in rows, and the third conductive segments and the fourth conductive segments of the second conductive patterns are arranged in columns.

10. The touch panel according to claim 8, wherein a total length of the first conductive segment and the second conductive segment is of a third value, and a total length of the third conductive segment and the fourth conductive segment is of a fourth value equal to the third value.

11. The touch panel according to claim 8, wherein the first conductive segment, the second conductive segment, the third conductive segment and the fourth conductive segment are of an identical length.

12. The touch panel according to claim 1, wherein
D is of a value of 0.5 mm,
C is a sum of a value of A and a value of B, and
when the first value and the second value are each greater than or equal to 3 mm and less than or equal to 4 mm, A is greater than 0 and less than or equal to 2 mm and B is greater than 0 and less than or equal to 2 mm,
when the first value and the second value are each greater than 4 mm and less than or equal to 5 mm, A is greater than 0 and less than or equal to 2.5 mm and B is greater than 0 and less than or equal to 2.5 mm,
when the first value and the second value are each greater than 5 mm and less than or equal to 6 mm, A is greater than 0 and less than or equal to 3 mm and B is greater than 0 and less than or equal to 3 mm, and
when the first value and the second value are each greater than 6 mm and less than or equal to 7 mm, A is greater than 0 and less than or equal to 3.5 mm and B is greater than 0 and less than or equal to 3.5 mm.

13. The touch panel according to claim 1, wherein the first conductive patterns and the second conductive patterns each comprise hexagonal meshes formed by conductive wires crossing each other.

14. The touch panel according to claim 1, wherein the conductive wire of each of the first conductive patterns and the second conductive patterns is of a diameter of 0.003 mm to 0.01 mm.

15. A display device comprising a display substrate and the touch panel according to claim 1.

16. The display device according to claim 15, wherein each first conductive pattern is of an X-shaped structure, two portions of the X-shaped structure crossing each other extend in directions identical to arrangement directions of a data line and a gate line on the display substrate.

* * * * *

UNITED STATES PATENT AND TRADEMARK OFFICE
CERTIFICATE OF CORRECTION

PATENT NO. : 9,703,437 B2  
APPLICATION NO. : 14/786498  
DATED : July 11, 2017  
INVENTOR(S) : Lei Zhang et al.

Page 1 of 1

It is certified that error appears in the above-identified patent and that said Letters Patent is hereby corrected as shown below:

In the Claims

Column 9, Lines 45-46, Claim 1:  
After "patterns are each formed at a region"  
Delete "surrounding" and  
Insert -- surrounded --.

Signed and Sealed this  
Twelfth Day of June, 2018

Andrei Iancu  
*Director of the United States Patent and Trademark Office*